United States Patent
Norton

[15] 3,704,787
[45] Dec. 5, 1972

[54] SEAL FOR DISPOSABLE MEDIA FILTER APPARATUS

[72] Inventor: Orien K. Norton, 2011 Elizaville Road, Lebanon, Ind. 46204

[22] Filed: Nov. 23, 1970

[21] Appl. No.: 91,881

[52] U.S. Cl. .................................................. 210/387
[51] Int. Cl. ............................................. B01d 33/00
[58] Field of Search ....... 210/387, 400, 401, 416, 455

[56] References Cited

UNITED STATES PATENTS

| | | | |
|---|---|---|---|
| 3,221,885 | 12/1965 | Hirs | 210/387 X |
| 3,485,379 | 12/1969 | Hutson | 210/400 |
| 3,333,693 | 8/1967 | Hirs | 210/387 X |
| 3,305,094 | 2/1967 | Casson | 210/387 X |
| 3,197,030 | 7/1965 | Black | 210/400 |
| 2,101,109 | 12/1937 | Thompson | 210/400 X |

*Primary Examiner*—Reuben Friedman
*Assistant Examiner*—T. A. Granger
*Attorney*—Trask, Jenkins and Hanley

[57] ABSTRACT

A filter apparatus in which a sheet of disposable filter media is moved by a carrier belt over the open top of a tank subjected to sub-atmospheric pressure, with liquid to be filtered disposed on the top face of the filter media to be drawn therethrough into the tank, and having seals formed at the side margins of the carrier belt and travelling with the belt to maintain the sub-atmospheric pressure in the tank.

6 Claims, 8 Drawing Figures

PATENTED DEC 5 1972 3,704,787

INVENTOR
ORIEN K. NORTON
BY
Woodard Weikart Emhardt & Naughton
ATTORNEYS

INVENTOR
ORIEN K. NORTON 3,704,787

SEAL FOR DISPOSABLE MEDIA FILTER APPARATUS

BACKGROUND OF THE INVENTION

Disposable media filter apparatus of the type referred to above is well known in the prior art, having the advantages of being continuous and self-cleaning. Its primary use is to filter, before recirculation, certain machine tool coolants or lubricants. U.S. Pat. No. 2,665,812 discloses filtering equipment of this general type. In such apparatus it is desirable to apply a vacuum to the area below the filter media for the purpose of drawing the liquid through the media and thus increase the amount of raw liquid which can be filtered in a predetermined time period. The presence of sub-atmospheric pressure below the filter media requires the side margins of the advancing filter band or strip to be effectively sealed against the tank sidewalls or adjacent structure. Various means for performing this sealing function have been attempted and typical of these is the stationary seal disclosed in U.S. Pat. No. 3,333,705. Stationary seals have various disadvantages, one primary difficulty being their tendency to bond with the relatively delicate filter media during, for example, overnight shut-down periods of the filter apparatus, particularly where somewhat tacky liquids are being filtered. When the apparatus is subsequently restarted, the filter media is torn and damaged.

The concept of the present invention provides a flexible seal member, attached to each of the side margins of the moving carrier belt on which the sheet of filter media is disposed. The seal has multiple points of engagement with adjacent, stationary structural members which cannot be injured by temporary bonding of the seal member to them. The sealing members do not move relative to the filter media and the bonding problem is thus overcome.

DESCRIPTION OF THE PREFERRED EMBODIMENTS

Figure 1:
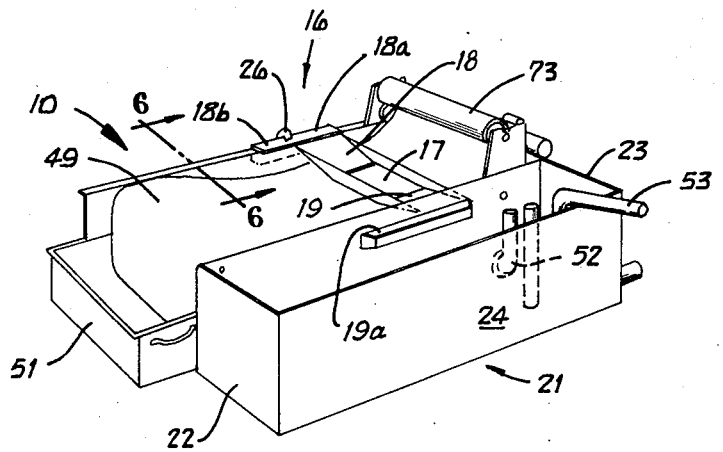
FIG. 1 is a perspective view of a filter apparatus embodying the present invention with the pump assembly removed to better show the underlying structure.

Referring initially to FIG. 1, a disposable filter apparatus embodying the present invention is illustrated. The apparatus includes a generally rectangular, open faced filtered liquid receptacle indicated generally at 10. As will be evident from FIGS. 2 and 3, the receptacle 10 is composed of sidewalls 11 and 12 and inset endwalls 13 and 14. Transversely overlying the open, upper face of the receptacle is an unfiltered fluid inlet assembly indicated generally at 16.

Figure 2:
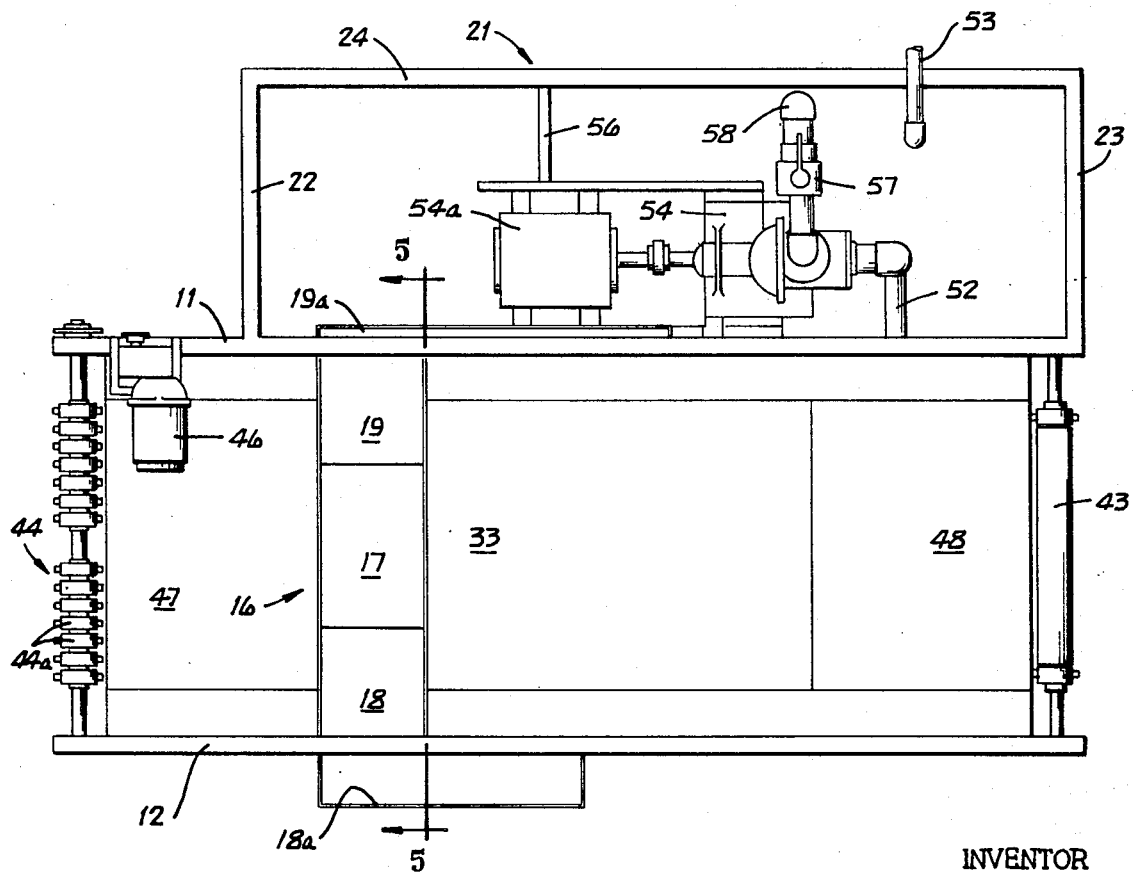
FIG. 2 is a top plan view of the apparatus shown in FIG. 1 but including the pump assembly.
Figure 5:
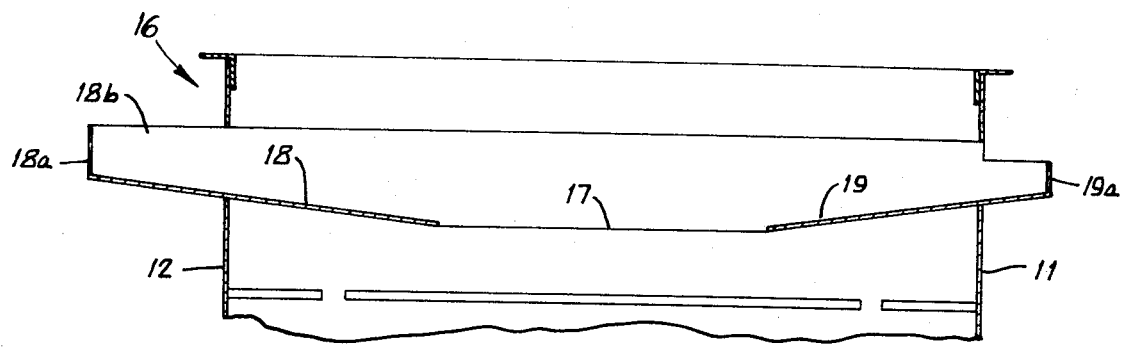
FIG. 5 is a fragmentary, sectional view taken generally along the line 5—5 of FIG. 2.

As may best be seen in FIGS. 2 and 5 the assembly 16 is a box-like structure having an open central area 17, bordered on each side by inclined plates 18 and 19. As may best be seen in FIG. 5, the assembly extends through the sidewalls 11 and 12 of the receptacle 10 and has upturned edges 18a and 19a. This extending portion, as will be evident from FIG. 2, is enlarged in width as compared to the portion of the assembly within the receptacle 10. The area indicated at 18b (FIG. 5) thus forms an inlet for introducing contaminated or unfiltered liquid onto the plate 18 from whence it moves to the open area 17 to drop onto the filter apparatus to be subsequently described.

Figure 4:
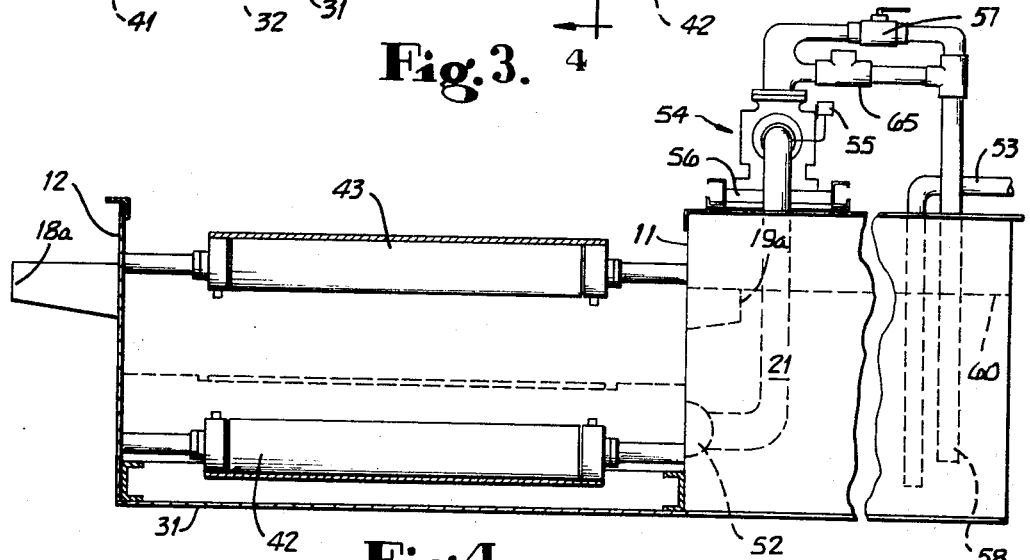
FIG. 4 is a sectional view taken generally along the line 4—4 of FIG. 3.

The portion of the plate 19 which extends beyond the sidewall 11 of the receptacle 10 also is elongated and its upturned portion 19a forms a weir which is intended to accommodate any abnormal overflow from the filtered or clean liquid tank, indicated generally at 21. This clean liquid tank extends in side-by-side relation to the receptacle 10 and has endwalls 22 and 23 cooperating with sidewall 24. A pump assembly overlies the tank as shown in FIGS. 2 and 4, this pump and attendant valves and piping being omitted from FIG. 1 to avoid obstructing the view of adjacent portions of the apparatus. By means of the pump assembly, the tank 21 receives filtered liquid from the portion of the receptacle 10 which lies beneath the filter media as will subsequently be described. The pipe 26 (FIG. 1) illustrates one form of possible introduction of unfiltered liquid to the inlet 18b, the unfiltered or contaminated liquid being pumped, for example, from a machine tool (not shown).

Figure 3:
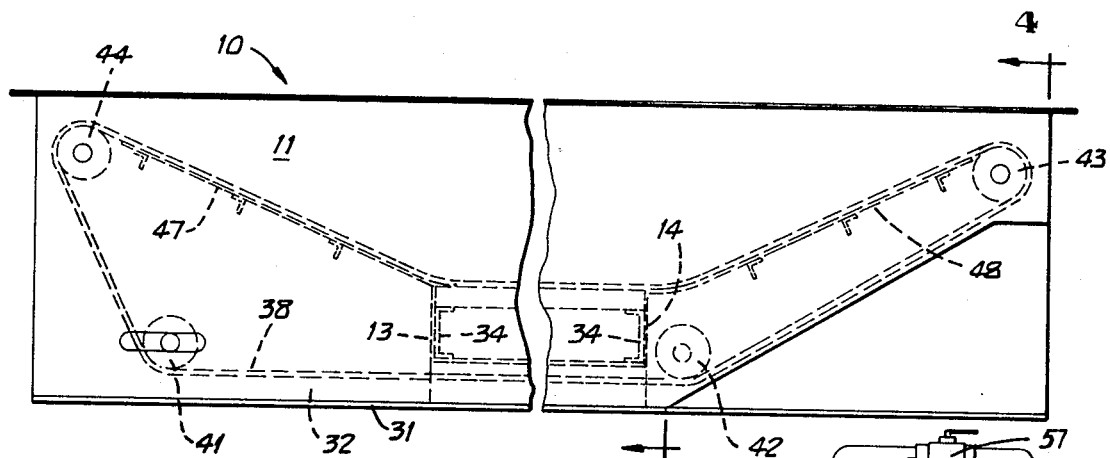
FIG. 3 is a side view of the apparatus shown in FIG. 2.
Figure 6:
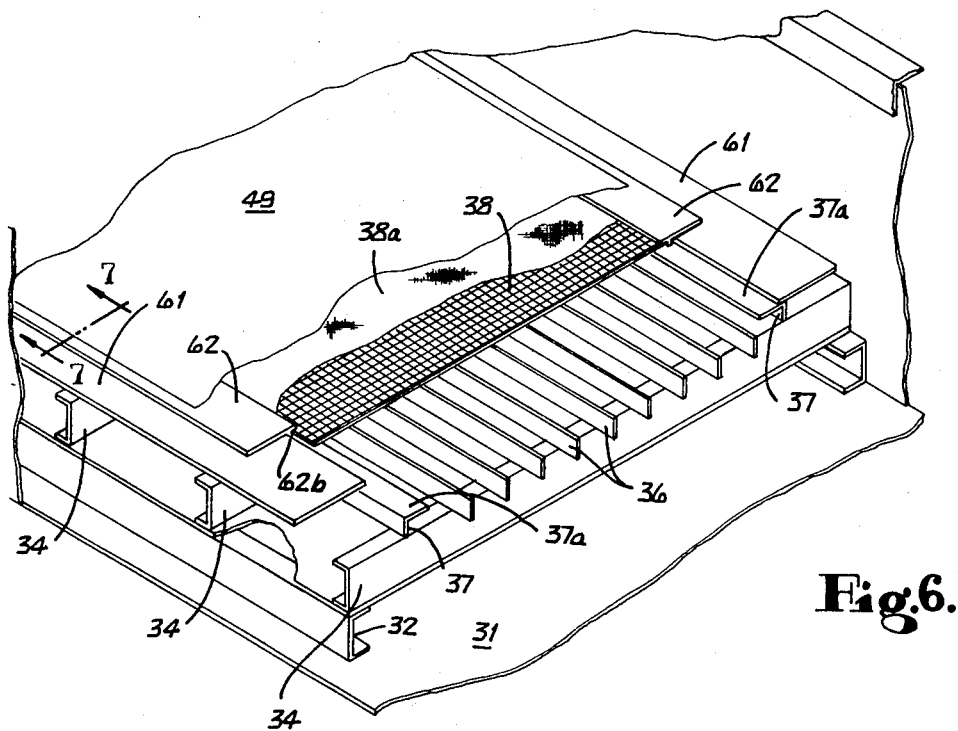
FIG. 6 is an enlarged, fragmentary perspective view of a portion of the apparatus shown in FIG. 1.

Referring primarily to FIGS. 2, 3, and 6, the internal construction of the receptacle 10 comprises a base plate 31 and, spaced above it by channels 32, a plate 33. Extending transversely across the open face of the receptacle are spaced, parallel channel members 34 (FIG. 6) upon which rest a series of spaced parallel support members 36 together with, at each side margin, the angle iron members 37. The flange 37a of the angle iron members extends inwardly toward the upper edges of the members 36, providing a supporting surface for a flexible, flat wire belt 38 (FIG. 6).

As may best be seen in FIG. 6 the belt 38 carries attached to its upper face a glass strip preferably of nylon monofilament indicated at 38a. The belt 38, as may best be seen in FIGS. 2 and 3 is driven over rollers 41, 42, 43 and sprocket 44. As may best be seen in FIG. 2 the sprocket 44 is composed of a series of members 44a having protrusions thereon which fit into the belt 38 and, powered by the motor 46, drive the endless belt 38 in the paths indicated by the arrows in FIG. 3. Inclined steel plates 47 and 48 permit the belt 38 to move in a path in which the belt moves lower as it passes over the central portion of the upper face of the receptacle 10, this conformation of the belt paths being particularly evident in FIG. 3.

As may best be seen in FIG. 1, extending transversely across one end of the receptacle 10 is a roll of a disposable filter media, preferably a specialized type of conventional paper filter, the roll being identified at 73.

As the belt 38 moves beneath the roll it carries with it a strip 49 of the filter media, passes it beneath the open areas 17 in the inlet assembly 16 and eventually deposits it in a disposal area within a container 51 which is positioned at the end of the receptacle 10.

As will be evident from FIG. 1, when unfiltered liquid is introduced through the pipe 26 into the inlet at the flange 18a, the fluid will run down the inclined plate 18 and through the opening 17 onto the central portion of the filter media strip passing over the receptacle 10. The liquid moves through the filter media and the perforate belt 38 into the underlying chamber whose base is formed by the plate 33.

The pump assembly for reducing below atmospheric the pressure in the portion of the tank underlying the filter media strip is shown in FIGS. 2 and 4. A pipe 52 provides communication between the receptacle 10 and the suction side of fluid pump 54 which is mounted on a frame 56 spanning the tank 21. The pump is driven by electric motor 54a (FIG. 2). Sensing the subatmospheric pressure at the pump suction is a conventional vacuum switch 55 which opens the pump circuit when the vacuum in the pump suction, and hence the subatmospheric pressure below the filter media 49 reaches a preset value. If the vacuum reaches the preset value, this indicates that the filter media portion then in use is coated and flow of liquid through it is substantially obstructed. The consequent actuation of switch 55, through an electrical circuit and timer, not shown, after a time delay causes an advancement of the filter media by motor 46 so that a clean filter portion underlies the opening 17. This automatic advancement of the filter media can also be modified so as to additionally occur at timed intervals and can also be triggered by a manually operable switch.

The filtered fluid flows from the pump discharge through an adjustable globe-valve 57 and, via pipe 58, into the filtered liquid tank 21. The filtered liquid level (indicated by broken line 60 in FIG. 4) rises to the margin 19a of the inclined plate 19, the filtered liquid overflowing onto the plate 19 and, through opening 17, passes again through the filter media into the receptacle 10. Filtered liquid may be pumped, by external means not shown, from tank 21 through pipe 53 and conveyed to a machine tool or other apparatus (not shown) to be returned to the filtering apparatus as contaminated liquid by means of pipe 26, previously mentioned.

It will be understood that more filtered liquid is pumped into the tank 21 by pump 54 than can be withdrawn through pipe 53. Hence the liquid level in tank 21 is always adjacent the plate margin 19a, so that while the pump 54 is shut-down during advancement of the filter media strip, an ample reservoir of clean liquid is available for withdrawal through pipe 53 during this pump shut down interval. Breaking the vacuum under the filter media strip upon shut-down of pump 54 is accomplished by permitting back-flow of clean liquid through the check valve 65 (FIG. 4), reversely through the pump and its suction line 52, back to receptacle 10. The check valve 65 permits such rapid, vacuum-breaking back-flow to occur more rapidly than would be the case if the back-flow had to occur solely through the throttling obstruction offered by the valve 57.

Figure 7:
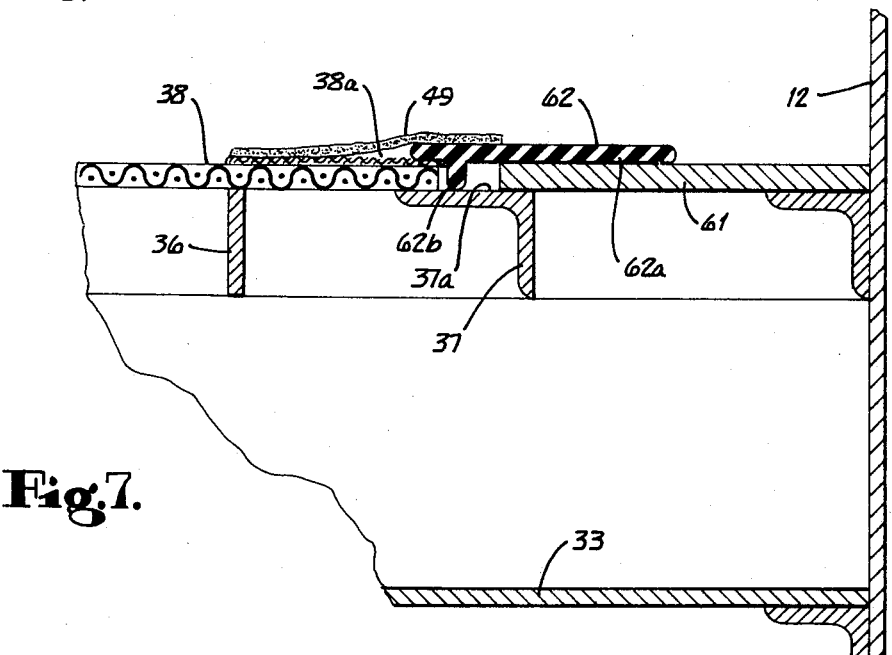
FIG. 7 is a fragmentary, sectional view taken generally along the line 7—7 of FIG. 6.

Particularly where a means, as described above, is provided for reducing the pressure in the portion of the tank underlying the filter media strip to sub-atmospheric, it is important that a sealing means be provided at the side margins of the belt and the longitudinal margins of the open face of the receptacle 10. This sealing means, forming the primary feature of the present invention, may best be seen in FIGS. 6 and 7.

Along each of the longitudinal margins of the open face of the receptacle 10 there are provided marginal plates 61 which rest on the supporting face 37a of the members 37. Flexible sealing flaps 62, preferably formed of synthetic rubber or similar material, are secured to the side marginal areas of the belt 38. The flaps 62 extend sidewardly from the belt margin and engage, at 62a in FIG. 7, the upper face of the plates 61. The sealing flaps 62 have a depending portion 62b which, at its tip, slidably engages the supporting surface 37a of the members 37. The primary seal between the area above the belt 38 and the underlying receptacle is thus provided by the slidable engagement of the sidewardly extending flaps with the adjacent surface of the marginal plates 61, such sealing engagement being indicated at 62a. A secondary seal is provided by the slidable engagement of the tip of the depending portion 62b with the adjacent, stationary supporting surface 37a.

Figure 8:
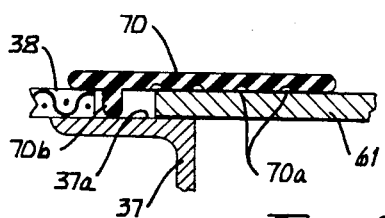
FIG. 8 is an enlarged, fragmentary sectional view, similar to FIG. 7, but illustrating a modified form of the sealing component of the present invention.

FIG. 8 illustrates a modified form of the sealing flap which is there identified at 70. This flap is similar in function and mounting (on the belt 38) as the flap 62, however, it differs in that the underface of the flap which engages the surface of the marginal plates 61 is longitudinally serrated as indicated at 70a. These serrations serve to reduce the surface area, thereby reducing friction with the plates 61 and also serve as a means for channelling particles picked-up in movement of the belt and in lubrication of the sliding engagement of the flaps with the underlying marginal plates.

The travelling seal thus provided between the belt and the adjacent margins of the open face of the receptacle 10 has the advantage, over the prior art stationary seals, in that the seal does not tend to bond to anything other than the steel surface of the plates 61 when the apparatus is shut-down for prolonged periods. The seal does not overlie or engage the relatively fragile media strip 49 and does not tend to tear or rupture the media strip when the apparatus is started since there is no relative movement between the seal members 62 and the filter media 49.

I claim:

1. A filter apparatus comprising a filtered liquid receptacle having a generally rectangular open upper face, marginal plates extending in parallel along two opposite sides of said receptacle and forming the longitudinal side margins of said open receptacle face, an endless perforate flexible belt adapted to move between and parallel to said marginal plates to thereby close the said open upper face of the receptacle, a strip of filter media disposed on said belt and continuously carried by the belt across said receptacle from a roll of said filter media at one end of the receptacle to a disposal area at the opposite end of the receptacle, means for depositing unfiltered liquid centrally on said filter media strip as it is transported by said belt, means for establishing subatmospheric pressure within said receptacle to draw liquid through said filter media strip and said belt into said receptacle, sealing means secured to and travelling with said belt, said filter media extending over at least a portion of said sealing means, and said sealing means extending over an adjacent portion of said belt and extending over at least a portion of and slidably engaging said marginal plate adjacent thereto for sealing the longitudinal junctions of said belt and said marginal plates.

2. A filter apparatus as claimed in claim 1 in which said sealing means comprise flexible sealing flaps secured to the side marginal areas of said belt and extending sidewardly in both directions from each side margin of said belt.

3. A filter apparatus as claimed in claim 2 in which the portions of said sealing flaps which slidably engage said marginal plates are longitudinally serrated.

4. A filter apparatus as claimed in claim 2 in which a flange extends inwardly toward the centerline of said belt from the underface of each of said marginal plates thereby presenting supporting surfaces for the side marginal areas of said belt, said sealing flaps each having a depending portion whose lower end slidably engages one of said supporting surfaces of said flange to provide a seal in addition to the seal provided by the slidable engagement of said flaps with said marginal plates.

5. Sealing means for a filter apparatus in which a filter media is carried by an endless belt traveling between marginal plates on both sides, unfiltered liquid is deposited centrally on the filter media, and low pressure is maintained below the belt to draw unfiltered liquid through the filter media, comprising flexible sealing flaps each having a horizontal portion extending over an adjacent portion of the belt and extending over at least a portion of and slidably engaging the marginal plate adjacent thereto, each of said flaps having a depending portion adjacent and connected to the side marginal area of said belt, the lower end of each of said depending portions slidably engaging a supporting surface of the filter apparatus, and said filter media extending over a part of said horizontal flap portion.

6. The invention set forth in claim 5 wherein the underfaces of the horizontal portions of said flaps which slidably engage said marginal plates have longitudinal serrations therein.

* * * * *